Nov. 8, 1938.    A. W. KEUFFEL    2,136,169
SLIDE RULE INDICATOR
Filed Oct. 26, 1935
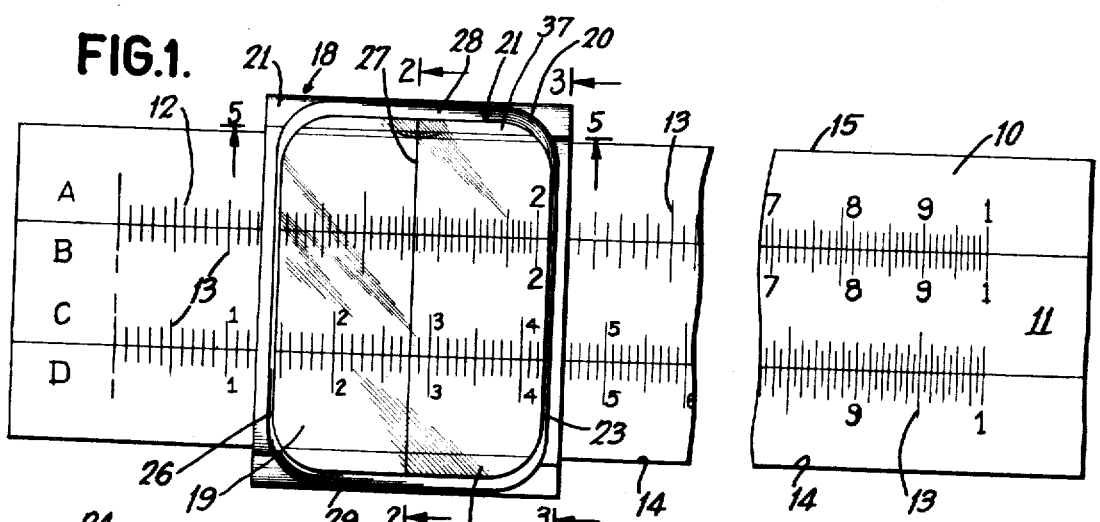
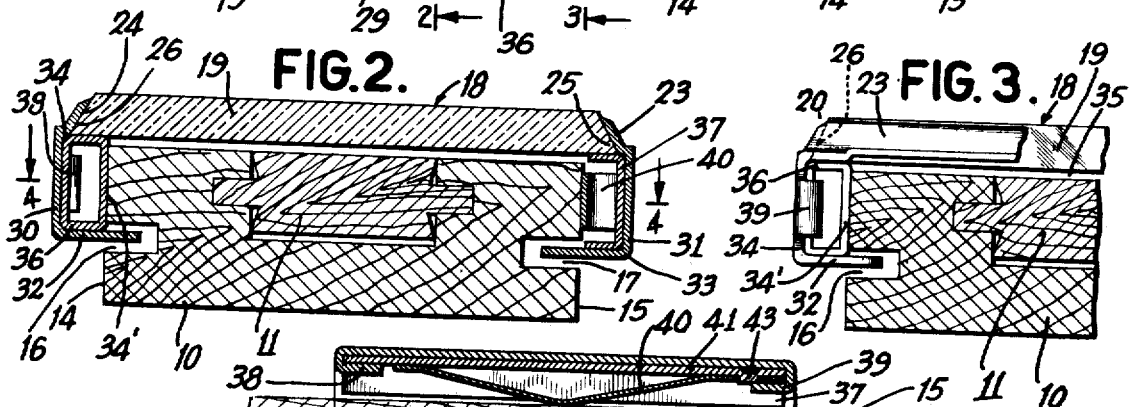
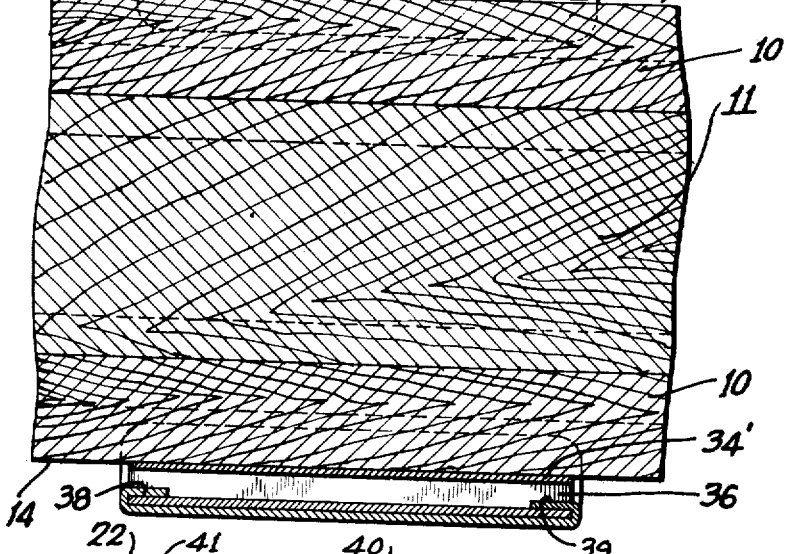
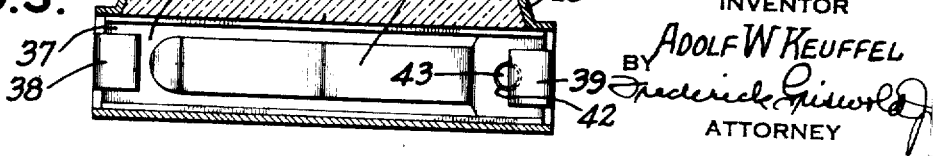
INVENTOR
ADOLF W KEUFFEL
BY Frederick Griswold
ATTORNEY Patented Nov. 8, 1938

2,136,169

UNITED STATES PATENT OFFICE 2,136,169

SLIDE RULE INDICATOR

Adolf W. Keuffel, Montclair, N. J., assignor to Keuffel & Esser Company, Hoboken, N. J., a corporation of New Jersey Application October 26, 1935, Serial No. 46,879

11 Claims. (Cl. 235—70)

The invention relates in general to a slide rule and relates specifically to the indicator or glass runner of slide rules.

In one form of such slide rule now in general use a numerical scale is formed on the top face of the rule and an indicator carrying an indicator glass provided with a hair line is slidably mounted for movement across the scale on the rule. In the manufacture of the rule the lines forming the different graduations of the scale are formed accurately so as to extend perpendicular to one of the longitudinal edges, usually the lower edge of the rule hereinafter sometimes referred to as the trued edge of the rule. In the use of instruments of this character, it is a requirement that the fine hair line on the indicator glass be maintained in exact parallelism with the fine graduation lines on the scale in the different positions into which the hair line is shifted as the indicator is slid into its different operative positions along the length of the rule. Considerable difficulty has been encountered heretofore particularly in the construction of inexpensive forms of indicators for slide rules to maintain this required accuracy in registration between the hair line on the indicator and the scale lines.

Accordingly the primary object of this invention is to provide a simplified form of slide rule indicator which will insure the maintaining during use of an exact parallel relation between the shiftable hair line and the scale lines in the different positions into which the indicator may be shifted; and at the same time to provide an improved form of indicator which can be easily and cheaply constructed as a factory proposition in forming the parts in an exact prefixed relative position in distinction from the usual custom made forms of indicators featuring exactly in the relation of its component parts.

Broadly this object is attained by providing a mounting for the indicator glass as a one-piece member formed primarily by die-pressing or die-casting, for instance, so that the component parts will be formed integral with each other and thus disposed in a prefixed relative relation with that degree of accuracy which characterizes metal parts formed by die-machine operation.

The present invention takes advantage of the fact that the lower edge of the rule is already formed accurately in a plane perpendicular to the length of the scale graduation lines and to the fact that with modern optical glass grinding and truing machines it is possible to form the hair line on the indicator glass in absolute parallelism to at least one of the two long parallel side edges of the indicator glass. The die formed mounting herein disclosed comprises an accurately formed locating seat for the indicator glass or at least a seat for one of the trued edges of the glass, and the providing of a guide flange lapping the trued edge of the rule and the inner face of which guide flange will be formed, by virtue of the fact that it is an integral part of the casting or pressing construction, to extend in a plane perpendicular to the edge of the seat and thus perpendicular to the length of the hair line. It thus follows that when the guide flange is in direct engagement with the trued edge of the rule, or is otherwise maintained in parallelism therewith as by means of the filler piece hereinafter disclosed, the hair line is maintained in position perpendicular to the plane of the edge of the rule and thus parallel to the scale graduation lines on the top face of the rule.

In prior constructions it has been known to provide a thin metal frame for the indicator glass and to secure thereto, usually by the use of fastening screws, separate side bars or spacing bars forming runners for engaging in the usual grooves on opposite sides of the longitudinal edges of the rule. Unless extreme care was used in the fabricating of indicators of this character, the side bars would not be located exactly perpendicular to the length of the hair line and jars and knocks on the indicator incidental to use are very apt to loosen the screw connections with the result that the hair line is apt to cant or shift angularly relative to the scale graduations. The present disclosure features the omission of separable parts which need fastening means, such as the screws of the prior devices to hold them in place, and in place of the usual side bars utilizes side wings which being formed integral with the glass frame forming portion by die machine operations are fixed relative to the frame forming portion and thus relative to the hair line on the glass. Incidentally the main pressing herein features utilizing of cooperating channel form structural parts which tend to reinforce and make rugged the indicator as a whole even when made of relatively thin gauge sheet metal.

Among the other objects of the invention are to provide a form of indicator in which the entire width of the top of the rule is visible through the indicator glass; in which the long sides of the frame are formed narrow to offer the least possible obstruction to the visibility of the scale numbers usually hid by such frames; into which the glass part of the indicator can be moved into contact with the top surface of the rule and thus bring the entire hair line into close position to the scale graduation lines and at the same time to maintain the metal frame and associated parts spaced away from the top of the rule and thus avoid possibility of scratching or otherwise marring the scale carrying top surface.

This aspect of the invention is provided by separate filler pieces which can also be formed as pressings, stampings or castings, or as drawn metal sections, and which can be fitted into the wings to maintain the indicator glass firmly on its seat. In the instant case, one of these filler pieces is simply a length of square tubing forming a shoe or replaceable, combined spacer and runner for spacing the guide flange above referred to from the trued side of the rule while maintaining them in their desired accurately disposed paralleled relation; and the other filler piece is provided with a spring functioning as does similarly located springs in known devices for maintaining the indicator as a whole in snug but slidable engagement with the trued side of the rule.

Still another object of the invention is to provide a form of indicator preferably formed of sheet metal as above indicated and in which minor parts such as the filler pieces may be easily secured in position in such way that they may be replaced when worn or damaged and in which separate fastening means such as screws and the like have been avoided.

In the accompanying drawing:

Fig. 1 is a plan view looking down upon a slide rule with parts broken away to reduce its length and provided with an indicator or runner constituting a preferred embodiment of the invention;

Fig. 2 is a transverse sectional view taken on the plane indicated by the line 2—2 of Fig. 1 looking in the direction indicated by the arrows;

Fig. 3 is a fragmentary view in end elevation of the indicator at the left side of the showing in Fig. 2 and at the bottom of Fig. 1 and with a portion of the rule in cross section taken on the plane indicated by the line 3—3 of Fig. 1;

Fig. 4 is an enlarged, horizontal sectional view through the indicator and adjacent portion of the rule and taken on the plane indicated by the line 4—4 of Fig. 2 looking downwardly as indicated by the arrows; and Fig. 5 is a vertical sectional view through the upper edge portion of the indicator as shown in Fig. 1, taken on the plane indicated by the line 5—5 of Fig. 1 looking outwardly and in the direction of the arrows and showing in side elevation the spring and its carrying insert shown in section in Figs. 2 and 4.

In the drawing there is shown a slide rule 10 of the Mannheim type together with a slide 11. The rule 10 and slide 11 are provided with the conventional sets of numbered scales 12 formed in each case of scale graduation or division lines 13. The rule is provided with an accurately planed lower edge 14 and an upper edge 15 parallel thereto and provided respectively with runner grooves 16 and 17. Also following conventional practices it is understood that the graduation lines 13 extend perpendicular to the plane formed by the trued lower edge 14 and sometimes hereinafter referred to as a plane of reference.

The indicator or runner 18, particularly forming the novel feature of this disclosure, resembles conventional structures of this character in that it comprises a transparent plate or indicator glass 19 mounted in a carrier 20 which includes side pieces slidably engaging in the channels 16 and 17. The distinctive feature herein is that the carrier is a one-piece, sheet-metal pressing which has been accurately and carefully die-pressed to the shape disclosed.

The carrier comprises a substantially rectangular, frame-forming, relatively flat top portion 21 provided with a substantially rectangular sight opening 22 having straight narrow sides and sharply curving rounded corners. The sight opening is outlined by an upwardly and inwardly extending flange 23 which forms a continuous bezel, the inner side of which forms a frusto-pyramidal seat 24 for the indicator glass 19. As the bezel is bevelled upwardly it provides a materially large area of surface for engaging the edges of the glass plate and at the same time provides the least possible obstruction to viewing the portions of the scale covered thereby.

The glass 19 is provided with a continuous bevelled edge 25 and it is a feature of this disclosure that at least one of the two long edges of this edge, such, for instance, as the left bevelled edge 26 be formed to extend accurately parallel to the hair line 27 conventionally engraved on the glass 19 in its longitudinal medial plane.

Opposite sides or ends 28 and 29 of the frame forming top portion are provided with integral extensions which are bent downwardly out of the plane of the top portion to form respectively guide flanges 30 and 31 and the extreme lower end portions of the extensions are again bent inwardly towards each other to form lower flanges 32 and 33 engaging in the grooves 16 and 17. The guide and lower flanges on each side form wings taking the place of the usual side bars, but in this case formed integral with and thus fixedly secured to the frame forming top portion 21. It is a feature of this disclosure that the guide flanges, or at least the guide flange 30 which faces the trued edge 14 of the rule be accurately formed so that its inner face 34 is located in a plane perpendicular to the length of the edge 26 of the seat 24. It will thus be seen that with the edge 26 of the glass parallel to the hair line 27 and with the inner face 34 of the guide flange perpendicular to the seat 26, then the inner face 34 is accurately set perpendicular to the hair line with that accuracy which is imposed on machined parts formed as the result of a die-press or die-cast operation. As noted, the wings are channel shaped with the channels facing each other and in each case positioned entirely offset outwardly from the adjacent edges of the rule so that the wings cannot contact with the top or side edge faces of the rule. It is likewise noted in Fig. 3 that the lower face 35 of the glass projects slightly below the frame forming portion on the two long sides of the indicator so that while the glass 19 may be brought into engagement with the top face of the rule, as is desirable, all of the metal parts forming the top frame forming portion of the indicator are maintained by the glass in spaced relation to the top of the rule.

The indicator glass is demountably held fitted to its bevelled seat by a pair of filler pieces 36 and 37 fitted in the channels of the wings and extending vertically between the lower flanges 32 and 33 and the edge portion of the glass above the same, and considered horizontally between the guide flanges 30 and 31 and the adjacent side edge 14 and 15 of the rule. The filler pieces are of slightly greater depth as viewed in Figs. 2 and 3 than the distance between the grooves and the top face of the rule thus permitting slight movement of the glass relative to the scale as above noted.

These filler pieces or retaining members are conveniently secured in position against longitudinal movement by small bendable end extensions 38 and 39 projecting from opposite ends of the flanges 30 and 31 and adapted to be bent in overlapped relation to engage the ends of the filler pieces as indicated in Figs. 3, 4 and 5. The spring of the lower flanges acts to clamp the filler pieces frictionally between the flanges and the edges of the glass plate.

In the case of the filler piece at the left of the showing, Figs. 2 and 3, and which slidably engages the trued edge 14, it is conveniently formed as a length of square or rather rectangular hollow tubing of uniform width throughout its length. This tubing or shoe has its outer wide flat sides formed parallel to each other as an incident of its original construction and as it engages snugly the inner face 34 hereinbefore described, it follows that the inner face 34¹ of the filler 30 is likewise located in a plane perpendicular to the hair line 27 and thus the parts are so arranged that when the face 34¹ engages the true edge 14, it automatically locates the hair line in its required parallel relation to the scale graduation lines 13. The parts are maintained in this position by a long leaf spring 40 carried by the web 41 of the filler piece 37 which in this case is pressed to channel form. The spring 40 is provided adjacent its secured end with an aperture 42 and the web portion of the channel is punched to provide a detent 43 fitting in the aperture and lapped by the adjacent lug 39 to thus secure the spring in position to bear on the adjacent upper edge 15 and to thus react through the indicator as a whole to maintain the shoe at its opposite or lower side in position in squared engagement with the trued edge 14 in the several adjusted positions of the indicator.

In manufacturing the indicator, it will be understood from this detailed description that the main pressing comprising the frame forming portion of the indicator and its associated guide flange or flanges are accurately formed by suitable die presses or like machines designed to perform accurate work on sheet metal. The glass, of course, is ground at its edges to fit the die formed seat and with its hair line parallel to at least one of the edges of the seat. The glass is inset from the underside of the frame and is held by the bevel seat from upward movement. The filler pieces are then slid endwise into position centered in their carrying wings and locked by bending over the end lugs and the indicator is then ready to be inserted on the rule.

The indicator as thus constructed is formed in addition to the glass of three simple sheet metal pressings, the main pressing and the two filler pieces and which pressings can be assembled with the glass and secured in position simply by bending the securing lugs into their filler piece clutching position. As every main pressing will be identically like every other such pressing, the custom fitting operations heretofore necessary in constructing indicators of this character have been eliminated with resulting economy in manufacturing costs. As the parts may be thus formed of a thin gauge metal there is also provided an economy in the amount of metal used and a desired lightness in weight has been attained. What would be otherwise frail parts when so formed of thin sheet metal are reenforced by the ribbed and channel or corrugation-like construction disclosed in the structure as illustrated. Parts which are likely to be bent are reenforced against such bending, it being noted that the filler piece 36 is of a tubular form which tends of itself to resist crushing and as it interfits between the vital and important guide flange 30 and the adjacent trued edge 14 of the rule, it tends to brace this flange from the rule. In general the channel shaped wings with the abutting filler pieces gives a double thickness to the channel shaped wings so that there is formed in effect at opposite, that is at the top and bottom edges of the indicator, a hollow but nevertheless a rugged end construction in turn coupled together by the wide spreading top portion 21. Even the fact that the bezel is upturned out of the plane of the top portion provides a truss form of corrugation which tends to prevent buckling of the top portion out of its plane and this in turn tends to maintain the wings and associated parts in fixed relation to the top portion and thus with the glass indicator and its hair line. As the indicator glass projects beyond the long edges longitudinally of the rule the hair line extending entirely across and even beyond the rule and the joint or line of contact between the filler piece 36 and the trued edge 14 is visible at all times, is intersected by the hair line and from time to time the operator can be assured that the indicator is in its proper position.

Various modifications will occur to those skilled in the art in the composition, disposition and configuration of the component elements going to make up this invention as a whole, and no limitation is intended by the phraseology of the foregoing description or illustrations in the accompanying drawing.

I claim:

1. An indicator for a slide rule comprising a one-piece sheet metal pressing and including means for setting an indicator glass in accurately fixed relation to the other parts, said means including a straight edge surface against which an accurately ground side edge of the indicator glass is designed to fit, said other parts including an integral element adapted to side lap an edge of the rule and having the inner face of said integral element extending in a plane perpendicular to the length of said straight edge surface and a filler piece including parallel sides with one of its parallel sides in snug engagement with said inner face, said inner face and said straight edge surface having an accuracy in their perpendicular relation such as characterizes die machine formed sheet metal structures whereby the other parallel face of the filler piece will likewise extend perpendicular to the length of said straight edge surface within the accuracy of a sheet metal pressing formed by a die machine operation.

2. A slide rule indicator comprising a frame forming portion provided with a sight opening and side wings integral with the frame, an indicator glass fitted in the sight opening, separable means for retaining the glass in place comprising two filler pieces fitted in the wings and adapted to receive the rule therebetween, and one of said filler pieces comprising a length of square tubing forming a replaceable long shoe for sliding on the adjacent edge of the rule and the other being a length of channel form, and a leaf spring having one end secured to the trough of the channel form and adapted to engage and bear against the adjacent edge of the rule to thus cause the long shoe to bear against its associated edge of the rule.

3. An indicator for a slide rule comprising an indicator glass and a carrier therefor, said carrier comprising solely three separable parts, one of said parts comprising a one-piece machine-formed sheet metal pressing including a pair of channel shaped wings with their troughs facing each other and a top portion provided with means for receiving the indicator glass, the other two parts fashioned to fit in the wings and acting to secure the glass in place, one of said other two parts constituting a length of square tubing constituting a long shoe for engaging flatwise against one side edge of the rule, and the other constituting a channel having a spring carried thereby and adapted to engage the other side edge of the rule, and said wings provided at their ends with integral extensions forming bendable lugs adapted to be bent about the ends of the shoe and channel to secure them in place.

4. A slide rule indicator comprising a metal frame substantially rectangular in plan and provided with a sight opening outlined by a bevelled seat facing downwardly, and a pair of integral extensions from two opposite sides of the frame coacting therewith to form a pair of opposing guide channels each terminating in an inwardly projecting flange, a transparent plate in the opening and engaging the seat, filler pieces located in the channels and fitted between each flange and the inner side edge of the transparent plate, the spring of the flanges tending to hold the filler pieces frictionally between the flanges and the edges of the glass, and each filler piece including an element engaging the web of the associated channel member and another element adapted to engage the adjacent side of the rule on which the indicator is mounted.

5. A slide rule indicator comprising a sheet metal stamping including a frame forming portion having a sight opening, and a pair of angled extensions extending integrally from opposite sides of said portion, a transparent plate fitted in said opening, and a pair of retaining members fitted in the included angles of said extensions and having a side of each engaging the transparent plate to secure it in the opening, another side engaging the angled extension and said extensions provided with integral lugs bent into position to engage opposite ends of the retaining members and thus acting to secure them in place.

6. A slide rule indicator comprising a one-piece sheet metal pressing including a substantially rectangular frame forming portion having a continuous, upwardly and inwardly extending bezel, and a pair of extensions depending integrally from a pair of opposite edges of the frame portion to form side elements and with the free edges of the extensions bent back beneath the frame portion to form flanges and coacting with the frame portion to form opposing channel elements, a transparent panel fitted within the bezel and a pair of retaining members, one for each channel positioned between each flange and the portion of the panel above the same to secure the opposite edges of the panel in place and means for securing the retaining members in place.

7. An indicator for a slide rule comprising an indicator glass and a carrier therefor, said carrier comprising salely three separable parts, one of said parts comprising a one-piece machine-formed sheet metal pressing including a pair of channel shaped wings with their troughs facing each other and a top portion provided with means for receiving the indicator glass, the other two parts fashioned to fit in the wings and acting to secure the glass in place, one of said other two parts constituting a length of square tubing constituting a long shoe for engaging flatwise against one side edge of the rule, and the other constituting a channel having a spring carried thereby and adapted to engage the other side edge of the rule.

8. A slide rule indicator comprising a frame forming portion provided with a sight opening and side wings integral with the frame, an indicator glass fitted in the sight opening to expose the entire width of a slide rule, separable means for retaining the glass in place comprising two filler pieces fitted in the wings and adapted to receive the rule therebetween.

9. A slide rule indicator comprising a metal frame substantially rectangular in plan and provided with a sight opening outlined by a bevellel seat facing downwardly, and a pair of integral extensions from two opposite sides of the frame coacting therewith to form a pair of opposing guide channels each terminating in an inwardly projecting flange, a transparent plate in the opening and engaging the seat, filler pieces located in the channels and fitted between each flange and the inner side edge of the transparent plate, the spring of the flanges tending to hold the filler pieces frictionally between the flanges and the edges of the plate.

10. A slide rule indicator runner formed of sheet metal and including a pressing comprising a frame forming portion and two integral extensions from opposite sides thereof forming two opposing channels, said frame provided with a sight opening to expose the entire width of a slide rule outlined by a flange forming a plate receiving seat, and a pair of filler members adapted to fit in the channels for securing a transparent plate to said seat.

11. A slide rule indicator comprising a sheet metal pressing, including a frame forming top portion and a side wing, an insert for the wing adapted to be located beneath the wing and the adjacent edge of the rule including a flanged pressing, a leaf spring provided with an opening adjacent one end, a detent pressed from the flanged pressing and engaging in the opening in the spring, and a lug integral with the flanged pressing overlapping the detent and spring and acting to secure the spring to the flanged pressing.

ADOLF W. KEUFFEL.